US011850948B1

(12) United States Patent
Spottiswoode et al.

(10) Patent No.: US 11,850,948 B1
(45) Date of Patent: Dec. 26, 2023

(54) DRAG DETECTION BY ELECTRICAL PARAMETERS

(71) Applicant: Rivian IP Holdings, LLC, Irvine, CA (US)

(72) Inventors: Quentin Arthur Cradock Watson Spottiswoode, York Close (GB); David Martin Armstrong, Wythall (GB)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 18/343,535

(22) Filed: Jun. 28, 2023

(51) Int. Cl.
*B60L 15/20* (2006.01)
*B60L 5/20* (2006.01)

(52) U.S. Cl.
CPC .............. *B60L 5/20* (2013.01); *B60L 2240/12* (2013.01); *B60L 2240/427* (2013.01); *B60L 2240/465* (2013.01); *B60L 2260/20* (2013.01)

(58) Field of Classification Search
CPC ................. B60L 15/20; B60L 2240/12; B60L 2240/427; B60L 2240/465; B60L 2260/20
See application file for complete search history.

(56) References Cited

U.S. PATENT DOCUMENTS

| | | | | |
|---|---|---|---|---|
| 6,528,959 B2 * | 3/2003 | Kitano | ................... | B60W 20/10 318/58 |
| 7,349,776 B2 * | 3/2008 | Spillane | .............. | B60W 50/085 701/36 |
| 9,493,160 B2 * | 11/2016 | Kelly | ..................... | B60K 28/16 |
| 9,849,879 B2 * | 12/2017 | Kelly | ................... | B60W 30/143 |
| 9,908,528 B2 * | 3/2018 | Kelly | .............. | B60W 30/18172 |
| 10,597,032 B2 * | 3/2020 | Kelly | ................... | B60W 10/119 |
| 10,754,340 B1 | 8/2020 | Corbett et al. | | |
| 11,281,223 B2 | 3/2022 | Corbett et al. | | |
| 11,543,821 B2 | 1/2023 | Corbett et al. | | |
| 2002/0041167 A1 * | 4/2002 | Kitano | .................. | B60W 10/06 318/3 |
| 2004/0263099 A1 * | 12/2004 | Maslov | .................... | B60L 50/20 318/400.24 |
| 2009/0024263 A1 * | 1/2009 | Simon, Jr. | ........... | F02D 41/1497 180/65.285 |
| 2009/0255746 A1 * | 10/2009 | Boesch | .............. | B60K 17/3462 180/197 |
| 2009/0318261 A1 * | 12/2009 | Tabata | .................. | B60W 20/10 477/3 |
| 2015/0057866 A1 * | 2/2015 | Tseng | ..................... | B60W 30/19 701/22 |
| 2015/0175009 A1 * | 6/2015 | Beever | .................... | B60L 15/36 701/22 |
| 2015/0203117 A1 * | 7/2015 | Kelly | .................... | B60W 40/06 701/91 |

(Continued)

*Primary Examiner* — Luis A Martinez Borrero
(74) *Attorney, Agent, or Firm* — Foley & Lardner LLP

(57) ABSTRACT

Drag Detection is provided. A system includes one or more processors of a vehicle, coupled with memory. The one or more processors can determine, for a vehicle, rolling drag based on energy input to one or more motors of the vehicle and a speed of the vehicle. The one or more processors can select, based on the rolling drag and a friction level associated with a surface on which the vehicle traverses, a slip target for the vehicle. The one or more processors can provide the slip target to a traction control system of the vehicle to control the one or more motors.

20 Claims, 7 Drawing Sheets

(56) References Cited

U.S. PATENT DOCUMENTS

| | | | |
|---|---|---|---|
| 2015/0203119 A1* | 7/2015 | Bird | B60W 30/18172 701/90 |
| 2015/0203123 A1* | 7/2015 | Darnell | B60W 10/22 701/37 |
| 2015/0210290 A1* | 7/2015 | Hemes | B60W 30/182 701/36 |
| 2015/0298697 A1* | 10/2015 | Kelly | B60W 50/12 701/41 |
| 2016/0001698 A1 | 1/2016 | Hall et al. | |
| 2016/0185216 A1* | 6/2016 | Clarke | B60K 6/52 74/665 F |
| 2016/0214603 A1* | 7/2016 | Owen | B60W 30/02 |
| 2016/0244057 A1* | 8/2016 | Kelly | B60W 30/143 |
| 2017/0043774 A1* | 2/2017 | Kelly | F16H 61/0213 |
| 2017/0057515 A1* | 3/2017 | Kelly | B60T 8/172 |
| 2017/0137026 A1* | 5/2017 | Hemes | B60W 10/20 |
| 2018/0141549 A1* | 5/2018 | Kelly | B60W 30/143 |
| 2019/0111932 A1* | 4/2019 | Falconer | B60W 10/20 |
| 2019/0161082 A1* | 5/2019 | Fairgrieve | B60W 10/184 |
| 2020/0406999 A1 | 12/2020 | Corbett et al. | |
| 2020/0407013 A1 | 12/2020 | Corbett et al. | |
| 2020/0409370 A1 | 12/2020 | Corbett et al. | |
| 2020/0409381 A1 | 12/2020 | Corbett et al. | |
| 2021/0197778 A1* | 7/2021 | Shi | B60T 8/1761 |
| 2022/0032781 A1* | 2/2022 | Veltman | B60L 15/2009 |
| 2022/0063672 A1 | 3/2022 | Corbett et al. | |
| 2022/0063758 A1 | 3/2022 | Corbett et al. | |
| 2022/0066448 A1 | 3/2022 | Corbett et al. | |
| 2022/0155787 A1 | 5/2022 | Corbett et al. | |
| 2022/0176825 A1* | 6/2022 | Fracchia | B60L 15/2036 |
| 2022/0219775 A1 | 7/2022 | Corbett et al. | |
| 2022/0219776 A1 | 7/2022 | Corbett et al. | |
| 2022/0219777 A1 | 7/2022 | Corbett et al. | |
| 2022/0219778 A1 | 7/2022 | Corbett et al. | |
| 2022/0227376 A1 | 7/2022 | Corbett et al. | |
| 2022/0227455 A1 | 7/2022 | Corbett et al. | |

* cited by examiner

DRAG DETECTION BY ELECTRICAL PARAMETERS

INTRODUCTION

Electric vehicles can include monitoring systems. Such systems may detect conditions indicative of a potential state of the electric vehicle or a sensor thereof. Moreover, efficient control of traction and motor torque when driving on certain types of surfaces can help reduce energy loss and improve battery performance of electric vehicles.

SUMMARY

This technical solution is generally directed to systems, methods and apparatus for drag detection. Vehicles can include mode selections for a driving mode. The mode selection can control vehicle operations, such as wheelspin, torque ramp, or torque vectoring. For example, the vehicle operation can vary between pavement and a gravel road, mud, sand, and wet grass. A user selection can be entered in error or can become stale as the vehicle transitions between surfaces. For example, a user of a vehicle traversing sand can select a slip target to permit substantial wheel speed in excess of a vehicle speed, but can thereafter enter a paved road without deselecting the option, which can lead to wheelspin which can negatively impact vehicle dynamics, tire wear, and increased energy draw from a battery, which can lead to earlier charging of the battery, leading to increased emissions of, for example, carbon dioxide. This technical solution can detect and adjust an operating mode of a vehicle, which can control the motor torque. Efficient control of motor torque can preserve battery power while improving the ability to progress on any given terrain, and thus reduce emissions of greenhouse gasses associated with energy generation.

At least one aspect is directed to a system. The system can include one or more processors of a computing system, coupled with memory. The one or more processors can determine, for a vehicle, rolling drag based on energy input to one or more motors of the vehicle and a speed of the vehicle. The one or more processors can select, based on the rolling drag and a friction level associated with a surface on which the vehicle traverses, a slip target for the vehicle. The one or more processors can provide the slip target to a traction control system of the vehicle to control the one or more motors.

At least one aspect is directed to a method. The method can be performed by one or more processors, coupled with memory, of a computing system. The method can include determining rolling drag for a vehicle based on energy input to one or more motors of the vehicle and a speed of the vehicle. The method can include selecting a slip target for the vehicle. The slip target can be based on the rolling drag and a friction level associated with a surface on which the vehicle traverses. The method can include providing the slip target to a traction control system of the vehicle to control the one or more motors.

At least one aspect is directed to an electric vehicle. The electric vehicle can include a plurality of electric motors. The electric vehicle can include a computing system comprising one or more processors, coupled with memory. The one or more processors can detect a condition of a motor of the electric vehicle. The one or more processors can determine, for the electric vehicle, rolling drag based on energy input to the plurality of electric motors of the electric vehicle and a speed of the electric vehicle. The one or more processors can select, based on the rolling drag and a friction level associated with a surface on which the electric vehicle traverses, a slip target for the electric vehicle. The one or more processors can provide the slip target to a traction control system of the electric vehicle to control the plurality of electric motors.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of drag detection. The various concepts introduced above and discussed in greater detail below may be implemented in any of numerous ways.

This disclosure is generally directed to adjusting vehicle operation based on a detected rolling drag level associated with a driving surface. Rolling drag can include or refer to a force opposing a rolling wheel over a driving surface, such as deformation of the surface, deformation of the tire, hysteresis losses to heat, or surface roughness that the tire ascends and descends as it traverses the driving surface. Rolling drag can vary over temperature, humidity, tire construction, or other environmental or vehicular variables. Vehicles can operate differently in various conditions, such as snow, mud, or pavement. A first portion of vehicle drive train energy can generate motive forces to transport the vehicle. A second portion of vehicle drive train energy can be applied to a driving surface (e.g., rolling drag; displacing or heating the mud, snow, etc.). A vehicle can include user-selectable options for various driving modes corresponding to various surface parameters which can include, for example, rolling drag, friction, temperature, or humidity. However, detection of a surface type can vary over time over distance (e.g., dirt-to-mud transitions), can be non-intuitive, or may not be selected by a user. It can be challenging to detect a surface condition at a rate that can adjust to changing terrain.

This technical solution can determine a rolling drag by comparing energy provided to a drive system to a change in speed or elevation of a vehicle. This technical solution can compare the detected drag to a current mode of operation. The comparison can include comparison to a partition in a multi-dimensional data structure (or distance therefrom), where the data structure includes dimensions corresponding to rolling or aerodynamic drag, friction, or other surface parameters. This technical solution can adjust a selected mode based on the comparison, such as by selecting another partition of the multi-dimensional data structure corresponding to the detected rolling drag.

Figure 1:
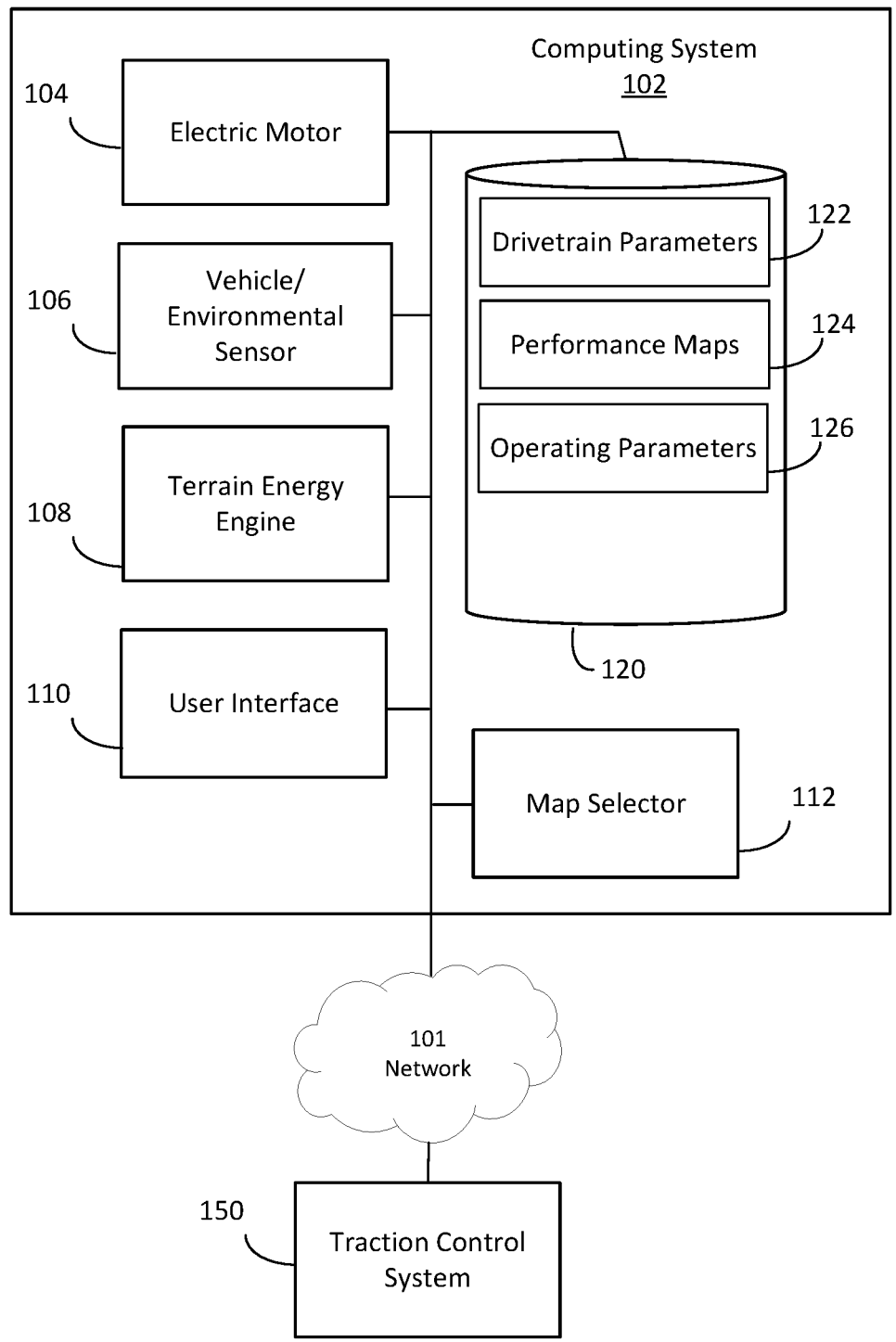
FIG. 1 depicts an example block diagram of a drag detection system.

FIG. 1 depicts an example system 100 of drag detection. The system 100 can include, interface with, or otherwise communicate with a computing system 102 of an electric vehicle. The system 100 can employ a network 101 to exchange information with a traction control system 150 of the electric vehicle. The computing system 102 can be part of, hosted by, or otherwise integrated with a component of the electric vehicle. The computing system 102 can include, interface with or otherwise communicate with the traction control system 150 via the network 101. The network 101 can include computer networks such as Ethernet networks, controller area network 101 (CAN) local interconnect networks 101 (LIN), Peripheral Component Interconnect Express (PCIe), the Internet, local, wide, metro, or other area networks 101, intranets, cellular networks 101, satellite networks 101, and other communication networks 101 such as Bluetooth, or data mobile telephone networks. The network 101 can be public or private. The various elements of the system 100 can communicate over the network 101.

The computing system 102 can include or be part of a vehicle. The computing system 102 can include or interface with at least one electric motor 104. The computing system 102 can include or interface with at least one mode selector vehicle sensor 106. The computing system 102 can include or interface with at least one terrain energy engine 108. The computing system 102 can include at least one user interface 110. The computing system 102 can include at least one map selector 112. The computing system 102 can include at least one data repository 120. The electric motor 104, vehicle sensor 106, terrain energy engine 108, user interface 110, or map selectors 112 can each include at least one processing unit or other logic device such as programmable logic array engine, or module configured to communicate with the vehicle data repository 120 or database. The electric motor 104, vehicle sensor 106, terrain energy engine 108, user interface 110, or map selectors 112 can be separate components, a single component, or part of the computing system 102. The computing system 102 can include hardware elements, such as one or more processors, logic devices, or circuits. For example, the computing system 102 can include one or more components or structures of functionality of computing devices depicted in FIG. 7.

The data repository 120 can include one or more local or distributed databases, and can include a database management system. The data repository 120 can include computer data storage or memory and can store one or more data structures, such as a drivetrain parameter 122, performance map 124, or operating parameter 126.

A drivetrain parameter 122 can refer to or include one or more data points of or associated with a drivetrain. For example, a drivetrain parameter 122 can include an efficiency or loss associated with a drivetrain component or a drivetrain. An efficiency can vary by mode of operation (e.g., front motor or rear motor), a vehicle loading such as a weight of occupants (e.g., as indicated by a number of occupants), or a weight of cargo or presence of a trailer. An efficiency can vary by environmental condition such as temperature or humidity. An efficiency can vary by battery voltage (e.g., corresponding higher currents can increase resistive losses). An efficiency can vary by mode, torque bias, or the like. For example, a mode including a slip target, torque limit, or torque vectoring parameter that is not matched to a surface can cause the vehicle to employ more or less wheelspin than a matched mode, which can increase overall energy use of the vehicle. A drivetrain parameter 122 can vary based on a selected wheel, or a condition of a vehicle. A drivetrain parameter 122 can include a moment of inertia, I, for rotating components such as wheel assemblies, axles, or electric motors 104.

A performance map 124 can refer to or include a data structure including a slip target, acceleration pedal map, steering map, torque vectoring map, or other map including various operating parameters 126 for a vehicle. A performance map 124 can correspond to a user-selected or automatically detected mode of operation. The performance map 124 can correspond to a partition of a multi-dimensional data structure, such as the structure of FIG. 3 or 4. For example, a detection of steady state driving, or a low traction surface can be indicative of a selection of an eco-mode, or snow mode. Each mode can correspond to a performance map 124 such that a user input or an input of an autonomy system can cause a different output. For example, a performance map 124 corresponding to a snow mode can include operating parameters 126 such that steering inputs can be damped, torque can be limited to a maximum value and slew, and a slip target permitting moderate wheelspin can be selected. In a performance map 124 corresponding to an eco-mode, operating parameters 126 such as steering inputs can be non-damped, torque can be limited to a second value, and slip target permitting mild wheelspin can be selected. Selection of an operating parameters 126 can be based on a selected performance map 124, or an operating parameter 126 can be selected separately therefrom (e.g., windshield wipers can be engaged in response to a detection of rain without selection of a performance map 124).

An operating parameter 126 can include any component of the performance map 124 or a separately controlled setting. For example, the operating parameter 126 can include a left to right or front to rear torque bias, slip target, or a setting for automatic headlights or windshield wipers. A slip target can refer to a target difference in wheel speed and vehicle speed, such as a fixed offset (e.g., miles per hour) or percent difference (e.g., 20%)). The traction control system 150 can limit torque from one or more electric motors 104 to reduce wheel slip in excess of a slip target. Torque bias can refer to an apportionment of torque between motors, such as based on desired handling characteristics (e.g., overstep or understeer), based on available wheel traction (e.g., reducing power to a wheel on a low traction surface relative to tires on a high traction surface, such as submerged rear wheels when launching a boat, or wheels which are on a soft shoulder of a road), or to simulate a mechanical differential, such as to permit, or, in the case of torque vectoring, cause, a vehicle to rotate to navigate an apex.

References to operating parameters 126 can include a correspondence to a performance map 124, or can refer to operating parameter 126 separately therefrom. For example, one or more operating parameter 126 can be selected separately from a performance map 124, such as according to a manual user entry. Some operating parameters 126 can be shared between performance maps 124, such that an operating parameter 126 may not be indicative of a selection between such performance maps 124. Some modes may not correspond to one or more operating parameters 126. For example, a power output threshold may not be associated with a performance map 124 for a towed vehicle.

The computing system 102 can include or interface with one or more electric motors 104 of an electric vehicle. The electric motor 104 can be electrically coupled to a battery and an inverter. An electric vehicle can include more than one electric motor 104. For example, a vehicle can include one electric motor 104 per axle (e.g., can include a front electric motor 104 and a rear electric motor 104) or one electric motor 104 per wheel. Electric motors 104 can couple to a plurality of wheels or axles through a differential. Each electric motor 104 can be coupled to a battery via a separate inverter. An inverter can interface with the electric motor 104 through an output port, such as via a switching component of the inverter. The inverter can invert the DC battery energy to an AC signal having any number of phases. For example, an inverter can contain one or three phases for a one or three phase AC electric motor 104.

An energy input to the electric motor 104 can refer to or include a detection of current or voltage to the electric motor 104 such that the electric motor 104 exerts more or less torque or force. The provision of the power can be conveyed via a controller for the electric motor 104 via an inverter or battery. For example, energy provided to an electric motor 104 can be determined based on a battery voltage and an inverter current. The amount of energy can refer to a commanded, detected, or other amount of energy. The amount of energy input to electric motors 104 can be sensed based on electrical parameters of the motors. For example, a known voltage, current, temperature-current relationship, or efficiency can be employed to determine the amount of energy provided to the electric motor 104. For example, sensors 106 can detect an amount of current and an amount of voltage provided to the motor, such that the computing system 102 can determine an energy contribution. The voltage or current can be measured at the inverter, battery, electric motor 104, or other component.

As indicated above, various vehicles can include various motors. For example, a first electric vehicle can include four wheels and four corresponding electric motors 104. The electric motors 104 can be referred to as a front right motor (MFR), front left motor (MFL), rear right motor (MRR), or rear left motor (MRL). The MFR and MFL can be referred to, collectively, as front motors; the MRR and MLR can be referred to, collectively, as rear motors. The energy, rolling drag, or other detections herein can be performed on a vehicle, axle, or motor basis.

The computing system 102 can include or interface with one or more vehicle sensors 106 configured to sense information associated with an operation of a vehicle or an environment interacting therewith. For example, the vehicle sensors 106 can determine a voltage or current to detect the energy provided to the motor. The vehicle sensors 106 can include shunt resistors, hall-effect sensors 106, thermistors, or current transformers. Each sensor 106 can monitor one or more batteries, inverters, electric motors 104, or the like.

The sensors 106 can detect indicia of vehicle operation. The sensors 106 can be part of, or in communication with, the traction control system 150. For example, the traction control system 150 and the computing system 102 can include same or different instances of the sensors 106 described herein. The sensors 106 can detect an elevation or gradient according to an accelerometer, global navigational satellite system (GNSS), differential wheel speed, or a predefined gradient or elevation associated with a map accessible to the electric vehicle. The sensors 106 can include wheel speed or wheelspin sensors 106, or interface sensors 106 such as throttle position sensors 106, or steering angle sensors 106 corresponding to a user interface 110 or autonomy system. The sensors 106 can include occupant sensors 106 indicative of a number of occupants, or other sensors 106 which can generate data indicative of vehicle loading or weight (e.g., current or voltage sensors 106 detecting acceleration on a level section of paved road or strain sensors 106 for the bed of a truck or a suspension component).

The sensors 106 can detect environmental conditions. For example, rain sensors 106 can detect a presence of rain based on a change in reflectivity of a wet or dry windshield, or a conductivity of a sensor 106 which varies from a dry state to a wet state. Temperature sensors 106 can detect a temperature of an ambient environment which can be indicative of a surface temperature of a driving surface the vehicle interfaces with, or another portion of an environment which the vehicle traverses. For example, the temperature sensor 106 can include a thermistor, a thermocouple associated with one or more vehicle components, or an integrated circuit. The ambient temperature can be determined based on a measurement of the ambient temperature, or a component of the electric vehicle having a known offset thereto. For example, an ambient temperature can be detected based on a temperature differential between two points in a fluidic circuit for battery coolant.

The computing system 102 can include or interface with one or more terrain energy engines 108. The terrain energy engine 108 can determine rolling drag or other indicia of a driving surface such as friction levels. For example, the terrain energy engine 108 can determine drag based on various sensor data and derivations thereof, including energy input to one or more motors of the vehicle and a speed of the vehicle. The computing system 102 can determine the rolling drag based on a comparison of the energy input to the one or more electric motors 104 and the operation of the vehicle. The operation of the vehicle can include or vary based on drive train efficiencies, speed, elevation, surface traction, speed of the vehicle, wheel slip, vehicle loading, or accumulation of material (e.g., mud or ice) over the wheels.

The terrain energy engine 108 can determine an amount of energy provided to a motor. The amount of energy provided to the motor can be based on sensor data from sensors 106 of the electric motor 104, inverter, battery, or other components of the electric vehicle.

The terrain energy engine 108 can determine an aggregate vehicular loss. The aggregate vehicular loss can include, for example, aerodynamic drag, and parasitic loss of various electrical circuits (e.g., radios, headlights, or energy supplied to the computing system 102). The aggregate vehicular loss determined by the terrain energy engine 108 can include drivetrain losses according to drivetrain parameters 122 and various sensor data. Drivetrain parameters 122 can include efficiencies of electric motors 104, inverters, bearings, or rotating losses from differentials or wheels. Losses can be linear or non-linear based on speed, and can exhibit further temperature dependencies, air pressure dependencies, voltages, or so forth. The terrain energy engine 108 can employ any information from the sensors 106 based on such dependencies. (e.g., adjusting an efficiency to a temperature, or motor efficiency to a battery voltage.) Some drivetrain parameters 122 can vary according to a road surface or vehicle fitment. For example, a drivetrain parameter 122 of wheel weight can vary based on wheel size, mass, or inertial moment. The drivetrain parameter 122 can include corresponding losses for one or more wheel types, or conditions. For example, a wheel traversing, or having recently traversed mud or snow can exhibit higher losses due to any accumulated material, relative to a clean and dry wheel which can be associated with paved surfaces.

The terrain energy engine 108 can determine an accumulated amount of kinetic and potential energy. For example, the terrain energy engine 108 can determine a kinetic energy of a vehicle based on an indication of a mass thereof, such as a number of occupants or an amount of cargo, or based on a predefined weight for the vehicle. The kinetic energy can further be determined based on a vehicle speed indication, which can be received by, for example, a vision or radar system of the vehicle, or determined based on drivetrain operation by the traction control system 150. For example, the computing system 102 can receive a vehicle speed indication from the traction control system 150 and determine the kinetic energy of the vehicle based thereupon.

The terrain energy engine 108 can determine energy imparted to driving surfaces (e.g., rolling drag) by subtracting other energy (e.g., the aggregate vehicular loss, and accumulated kinetic and potential energy) from the energy provided to the electric motors 104. Such energy impartation can be indicative of a driving surface. The terrain energy engine 108 can provide the rolling drag to the map selector 112 to control various portions of vehicle operation. The control can, in turn, affect the operation of the terrain energy engine 108 (e.g., by increasing or decreasing wheel slip, or selecting a different driving surface type based upon which the terrain energy engine 108 can detect a different drag amount). That is, the terrain energy engine 108 and map selector 112 can iteratively determine a rolling drag amount and map selections, respectively, to control the electric vehicle.

The computing system 102 can include or interface with one or more user interfaces 110. The user interface 110 can be designed, constructed, or operational to interface with a user, such as an occupant of an electric vehicle. The user interface 110 can be integral to the vehicle, or include or be instantiated by a mobile device such as a mobile phone. The user interface 110 can receive a selection of a drive mode of the vehicle. The drive mode can correspond to various vehicle operating parameters 126 such as a slip target, torque bias, or various other operating parameters 126 of a steering map 124. The drive mode can include (e.g., correspond to) a slip target which can be a same slip target corresponding to drag detected by the terrain energy engine 108 or can differ therefrom. For example, the user interface 110 can receive a user selection of a drive mode, and can thereafter detect a surface which does not correspond the selected drive mode. The differences in drive mode can vary based on temperature, friction, humidity, speed, or other dimensions of a multi-dimensional data structure.

The user interface 110 can provide a notification to a user including a prompt, such as an indication of a selected rolling drag or road surface. The prompt can indicate a selection of a difference between a previously selected road surface and a detected road service. The prompt can include an indication of energy savings associated with the change on the mode of operation. The user interface 110 can receive a response to the prompt, such as a confirmation or rejection of a change of operation to the detected driving surface. The user interface 110 can provide an indication of a detection of a selected mode without a prompt to reject the change, or can omit an indication of a change to a selected mode. The user interface 110 can include a selection or display of a manual driving mode selection. The user interface 110 can include an "auto" mode, wherein the vehicle automatically selects a mode based on a detection of rolling drag or other indica. The user interface 110 can include one or more manual modes. The one or more manual modes can include a lock, override, or other function (e.g., radio button, check box, or flag bit) to indicate that the selected mode should not be overridden, or include a variable selection (e.g., a scrollbar for "low" "medium" and "high" options) to select a threshold difference permitted from a selected mode to a detected region prior to overriding the selected mode.

A number or type of drive modes indicated by the user interface 110 can be different from a number or type of drive modes automatically selectable. For example, the multi-dimensional data structure can include hundreds or thousands of partitions, or gradient functions, and a display can include, for example, four, eight, or twelve selectable options.

The computing system 102 can include or interface with one or more map selectors 112. The map selectors 112 can select a portion of a multi-dimensional data structure based on the drag. For example, one dimension of the multi-dimensional data structure can be vehicle rolling drag; various dimensions can include front motor rolling drag, rear motor rolling drag, or can otherwise be based on rolling drag. A dimension of the multi-dimensional data structure can include or be based on a friction level of the driving surface, which the map selector 112 can receive from the traction control system 150 or another element of the computing system 102. A dimension of the multi-dimensional data structure can include or be based on a temperature received from the sensors 106, a wheel type from the drivetrain parameters 122, or other indicia of a mode of operation for the electric vehicle. For example, a three-dimensional data structure can include drag, friction, and temperature, axis. The map selector 112 can select a multi-dimensional data structure (e.g., a two-dimensional plane of the three-dimensional data structure) based on the temperature. The map selectors 112 can thereafter select a slip target or other vehicle operating parameter 126 based on a lookup in the two-dimensional plane selected based on the temperature (e.g., based on a location corresponding to a partition associated with a slip target). Put differently, the map selector 112 can select, based on the rolling drag and a friction level associated with a surface on which the vehicle traverses, a slip target for the vehicle.

The map selector 112 can provide a slip target to a traction control system 150 of the vehicle to control the one or more motors. The provision of the slip target can include a conveyance of a slip target including a slip speed or slip percent, or a selection of a driving mode based on a partition. For example, the map selector 112 can select the slip target based on a lookup in the multi-dimensional data structure that includes various partitions corresponding to a various types of driving surfaces (e.g., based on a driving mode corresponding to the driving surface).

The map selector 112 can compare one or more detected driving modes, slip targets, or other control parameters associated therewith to a user-selected driving mode. A threshold difference between the surfaces can vary based on a metric distance such as a Euclidean distance, Manhattan Difference, Chebyshev distance, cosine similarity, or Minkowski Difference. A metric distance can satisfy a tolerance when it is less than a predefined threshold, and may not satisfy the tolerance when the metric distance exceeds the predefined threshold. Some selections or satisfactions of tolerances can be based on other operating conditions of a vehicle (e.g., the map selector 112 can determine that a vehicle traveling at 75 miles per hour is not rock climbing, or that a vehicle exhibiting slip angles of less than one percent is not traversing sand dunes).

The map selector 112 can determine, based on the lookup in the multi-dimensional data structure with the rolling drag and the friction level, a user-selected operating mode, partition, or corresponding operating parameter 126 (e.g., slip target of the drive mode) does not satisfy a tolerance, and override, based on the determination the user selected slip target with a computing system 102 detected slip target, torque bias or other parameter, driving mode, or partition. The map selector 112 may override or omit an override based on a selection based on a lock, override, recency of entry, or other function entered in the user entry.

Satisfaction can refer to a position of a data value with regard to a threshold (e.g., less than or greater than a one-dimensional threshold, or within metric distance of a multi-dimensional data structure, such as a detection region, tolerance threshold, or partition location). Satisfaction can include a temporal component, such as a minimum time detecting a terrain before adjusting an operating parameter 126, or a minimum time between receiving a user entry and overriding the user entry. The map selector 112 can determine a satisfaction of a threshold, based on a lookup in a multi-dimensional data structure with the rolling drag and the friction level, of a different slip target than a selected slip target for a rolling drag and a friction level of a surface which the vehicle traverses. For example, the different slip target can be a slip target corresponding to a selected drive mode. The map selector 112 can determine whether a difference between the slip targets or either of the slip targets satisfies a tolerance threshold based on a lookup in a multi-dimensional data structure with the rolling drag and the friction level. For example, one of the slip target associated with the selected drive mode, or the slip target based on the driving surface may satisfy the threshold, and the other may not. The map selector 112 can override a slip target which does not satisfy the threshold, with a slip target that does. For example, the map selector 112 can override a selected or detected slip target with another slip target, and provide the override slip target to the to the traction control system 150, based on the satisfaction of the tolerance threshold.

The computing system 102 can include, interface with or otherwise communicate with one or more traction control systems 150. The traction control system 150 can control a motor or a combination of motors to control an application of energy to various motors, and braking to associated wheels. For example, the traction control system 150 can maintain vehicle stability according to a detected steering angle, driving surface throttle position, etc. The traction control system 150 can operate based on one or more operating parameters 126 or performance maps 124 indicated or conveyed by the computing system 102.

In some cases, the computing system 102 can improve, adjust, or otherwise modify aerodynamic features of the vehicle 205. The computing system 102 can improve the aerodynamics of the vehicle 205 in order to reduce drag or friction. For example, the computing system 102 can activate a wing of the vehicle 205, close one or more windows of the vehicle 205, close a truck bed cover of the vehicle 205, or activate or actuate other components, flaps, or covers of the vehicle 205 that can reduce an amount of air friction or otherwise improve aerodynamics of the vehicle 205.

The computing system 102 can use information determined by the terrain energy engine 108 or the map selector 112 to control aerodynamics for the vehicle 205. The computing system 102 can proactively adjust vehicle aerodynamic features (e.g., an active wing, window openings, or truck bed cover) to further improve efficiency of the vehicle 205.

To do so, the computing system 102 can establish, from chassis input, how a change in surface or terrain (e.g., as determined via one or more component of the computing system 102) affects the overall vehicle energy usage while in motion. The terrain energy engine 108, by deducting the amount of energy lost due to terrain or surface drag from the overall consumption, can determine an amount of energy consumed or lost due to aerodynamic friction or drag. The computing system 102 can, responsive to determining that the amount of aerodynamic friction is greater than or equal to a threshold, activate or actuate a component of the vehicle 205 that can reduce an amount of aerodynamic friction while the vehicle 205 is in motion. For example, the computing system 102 can activate or actuate one or more of a wing, a window, or truck bed cover responsive to determining that the amount of aerodynamic friction is greater than or equal to a threshold, where the amount of aerodynamic friction can be determined via the output from the terrain energy engine 108. The computing system 102 can automatically activate or actuate the component to reduce aerodynamic friction and increase the range of the vehicle. The computing system 102 can provide a notification, alert, or prompt to a user or driver of the vehicle 205 via a display device of the vehicle 205 with a suggestion or request to activate or actuate the component of the vehicle 205 to reduce aerodynamic friction in order to increase the range of the vehicle 205. The computing system 102 can inform the user or driver of the vehicle 205 how conditions (e.g., camping trip loading, windows being open, or bikes on back) can affect a predicted range of the vehicle 205.

Figure 2:
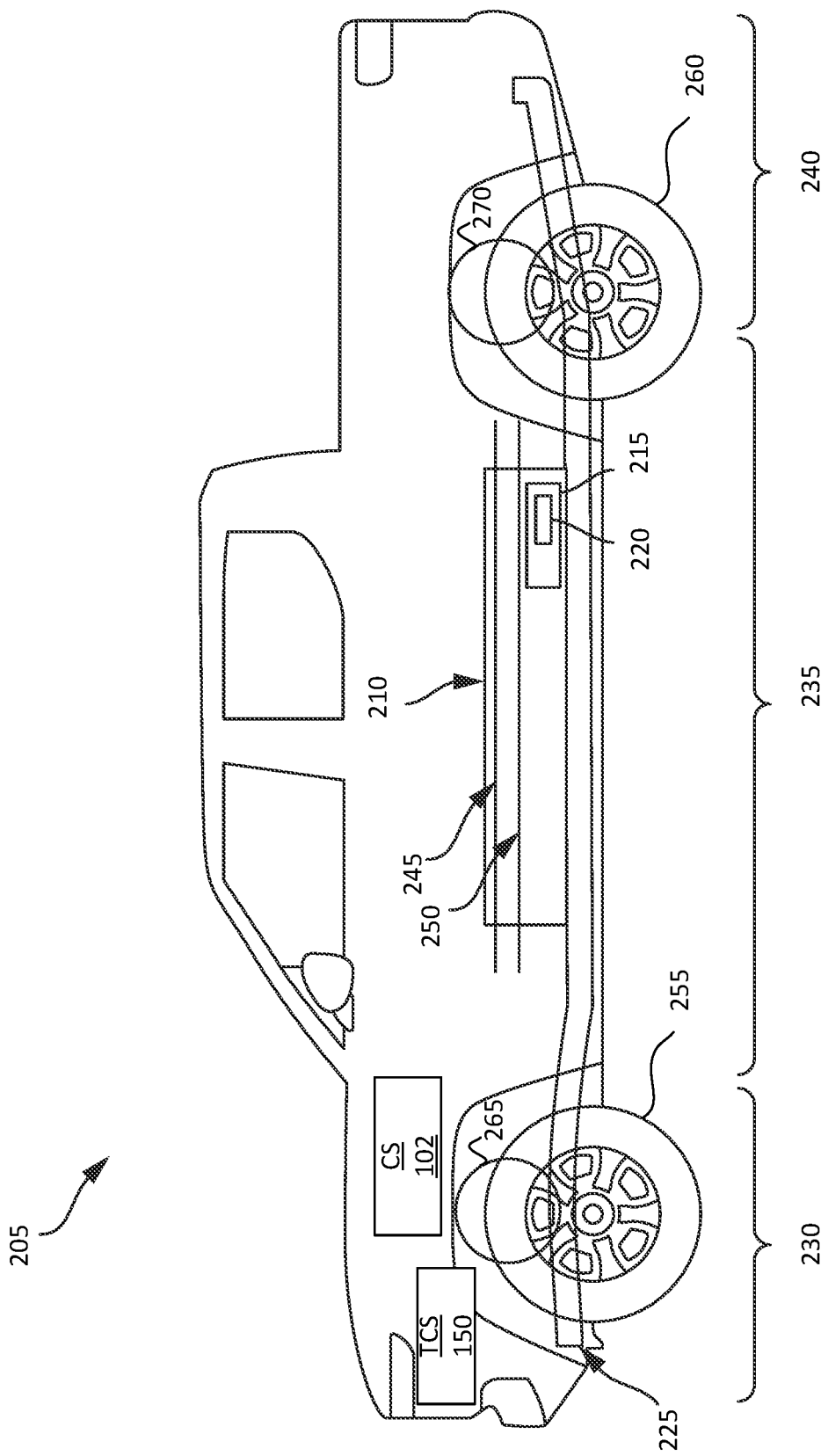
FIG. 2 depicts an example electric vehicle.

FIG. 2 depicts an example cross-sectional view of an electric vehicle 205 installed with at least one battery pack 210. Electric vehicles 205 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 210 can also be used as an energy storage system to power a building, such as a residential home or commercial building. Electric vehicles 205 can be fully electric or partially electric (e.g., plug-in hybrid) and further, electric vehicles 205 can be fully autonomous, partially autonomous, or unmanned. For example, electric vehicles 205 can include autonomous controls to approach, couple, decouple, or vacate a charging station. Electric vehicles 205 can also be human operated or non-autonomous. Electric vehicles 205 such as electric trucks or automobiles can include on-board battery packs 210, batteries or battery modules 215, or battery cells 220 to power the electric vehicles. The electric vehicle 205 can include a chassis 225 (e.g., a frame, internal frame, or support structure). The chassis 225 can support various components of the electric vehicle 205. The chassis 225 can span a front portion 230 (e.g., a hood or bonnet portion), a body portion 235, and a rear portion 240 (e.g., a trunk, payload, or boot portion) of the electric vehicle 205. The battery pack 210 can be installed or placed within the electric vehicle 205. For example, the battery pack 210 can be installed on the chassis 225 of the electric vehicle 205 within one or more of the front portion 230, the body portion 235, or the rear portion 240. The battery pack 210 can include or connect with at least one busbar, e.g., a current collector element. For example, the first busbar 245 and the second busbar 250 can include electrically conductive material to connect or otherwise electrically couple the battery, the battery modules 215, or the battery cells 220 with other electrical components of the electric vehicle 205 to provide electrical power to various systems or components of the electric vehicle 205.

Each of a front wheel set 255 and a rear wheel set 260 can include a tire to interface with a driving surface. A tire impart energy to the driving surface as heating, surface deformation, or displacement of materials of the driving surface, collectively referred to as rolling drag. The front wheel set 255 can include a front motor 265 configured to receive energy from the battery pack 210 to drive a tire of the front wheel set 255. The rear wheel set 260 can include a rear motor 270 configured to receive energy from the battery pack 210 to drive a tire of the rear wheel set 260. Each of the front motor 265 and rear motor 270 can be in network communication with the computing system 102 and the traction control system 150. The electric motors 265, 270 can include a controller in network communication with the computing system 102, or an inverter or controller electrically connected to the electrical motors 265, 270, which is connected to the network 101 of FIG. 1.

Figure 3:
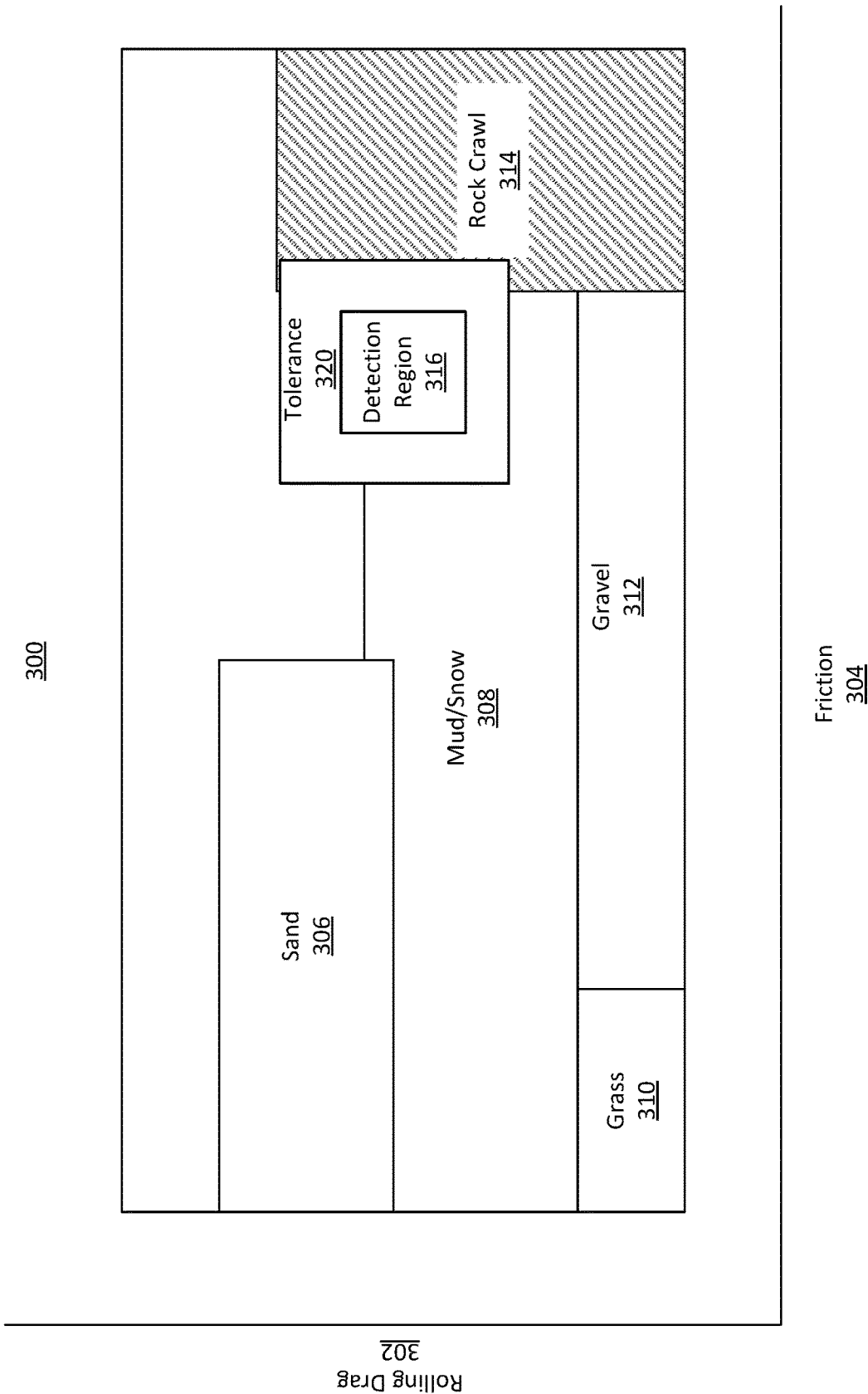
FIG. 3 depicts a multi-dimensional data structure including partitions corresponding to operating parameters of the electric vehicle.

FIG. 3 depicts a multi-dimensional data structure 300 including partitions corresponding to operating parameters 126 of the electric vehicle 205. The depicted data structure 300 includes two dimensions, a wheel drag axis 302 and friction axis 304, for ease of depiction. Various data structures can include any number of dimensions, such as a temperature, speed, aerodynamic drag, humidity, or number of motors. Dimensions can be discrete or continuous, and can include partitions. Partitions can refer to a contiguous or non-contiguous portion of the multi-dimensional data structure 300 which are associated with a driving mode including operating parameters 126 such as a slip target, torque bias, torque limit, speed limit, or torque vectoring parameter. Some operating parameters 126 can be included in a performance map 124. A partition can include a same set of operating parameters 126, or one or more sub-portions, gradients, or so forth. For example, the depicted sand partition 306 can correspond to a sand driving mode with predefined operating parameters 126, include one more sub-partitions which each include a set of predefined operating parameters 126, or can include a gradient of varying operating parameters 126 (e.g., according to an amount of rolling drag or an amount of friction, which can vary based on particle size or moisture content).

The partitions can vary based on the dimensions of the data structure 300. For example, the grass partition 310 and mud partition 308 can include overlapping friction levels with the sand partition 306, but vary according to a rolling drag (e.g., the grass or moisture can hold together the soil to prevent deformation which can reduce energy loss). The gravel partition 312 can include a similar rolling drag as the grass partition 310 but vary according to a friction level. Selecting an appropriate partition can avoid excessive wheelspin or "flinging" of a driving surface material, reducing energy used to propel the vehicle, extending battery life and range, and decreasing emissions associated with vehicle charging.

A rock crawl partition 314 corresponds to high friction, relative to the other depicted modes. The rock crawl partition 314 can correspond to a user selected drive mode (e.g., a "rock crawl" mode). According to the systems and methods described herein, the terrain energy engine 108 can determine a rolling drag amount or range, and the terrain energy engine 108 (or another component of the system 100 of FIG. 1) can determine a friction level amount or range. A corresponding detected range is indicated as the detection region 316. The detection region 316 can include a central point or portion based on a detected range, and a distance therefrom based on a tolerance 320. For example, in the depicted data structure 300, the detection region 316 does not overlap with the selected rock crawl partition 314, but the selected rock crawl partition 314 is within a tolerance 320 threshold (e.g., distance metric). Some detection regions 316 can be a point or line. Some tolerances 320 can be no greater than a detection region 316 or point. Some tolerances 320 can extend different amounts in different dimensions, or apply selectively to one or more partitions, or can depend on a user input to the user interface 110.

Figure 4:
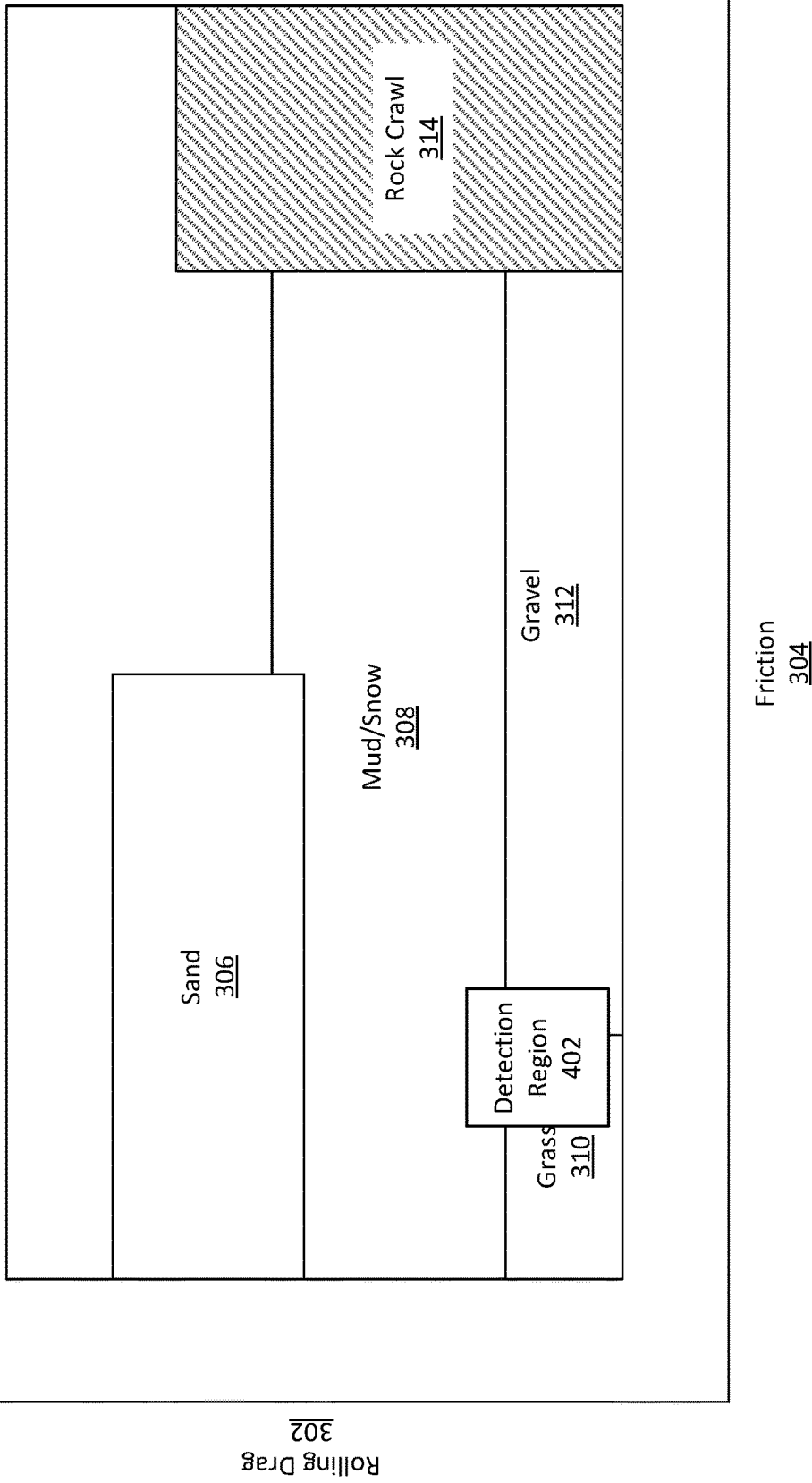
FIG. 4 depicts a multi-dimensional data structure including partitions corresponding to operating parameters of the electric vehicle.

FIG. 4 depicts another multi-dimensional data structure 400 including partitions corresponding to operating parameters 126 of the electric vehicle 205. As depicted, another detection region 402 does not overlap with the selected rock crawl partition 314. Further, no tolerance threshold extends between the detection region 402 and the selected rock crawl partition 314. According to the non-satisfaction of the threshold (e.g., the threshold of zero), the computing system 102 can select a partition which does not correspond to the selected rock crawl mode. For example, the computing system 102 can select the grass partition 310, based on the portion of overlap with the detection region 316, or the mud/snow partition 308 based on a lesser distance (e.g., greater similarity) to the selected rock crawl partition 314, relative to the grass partition 310.

Figure 5:
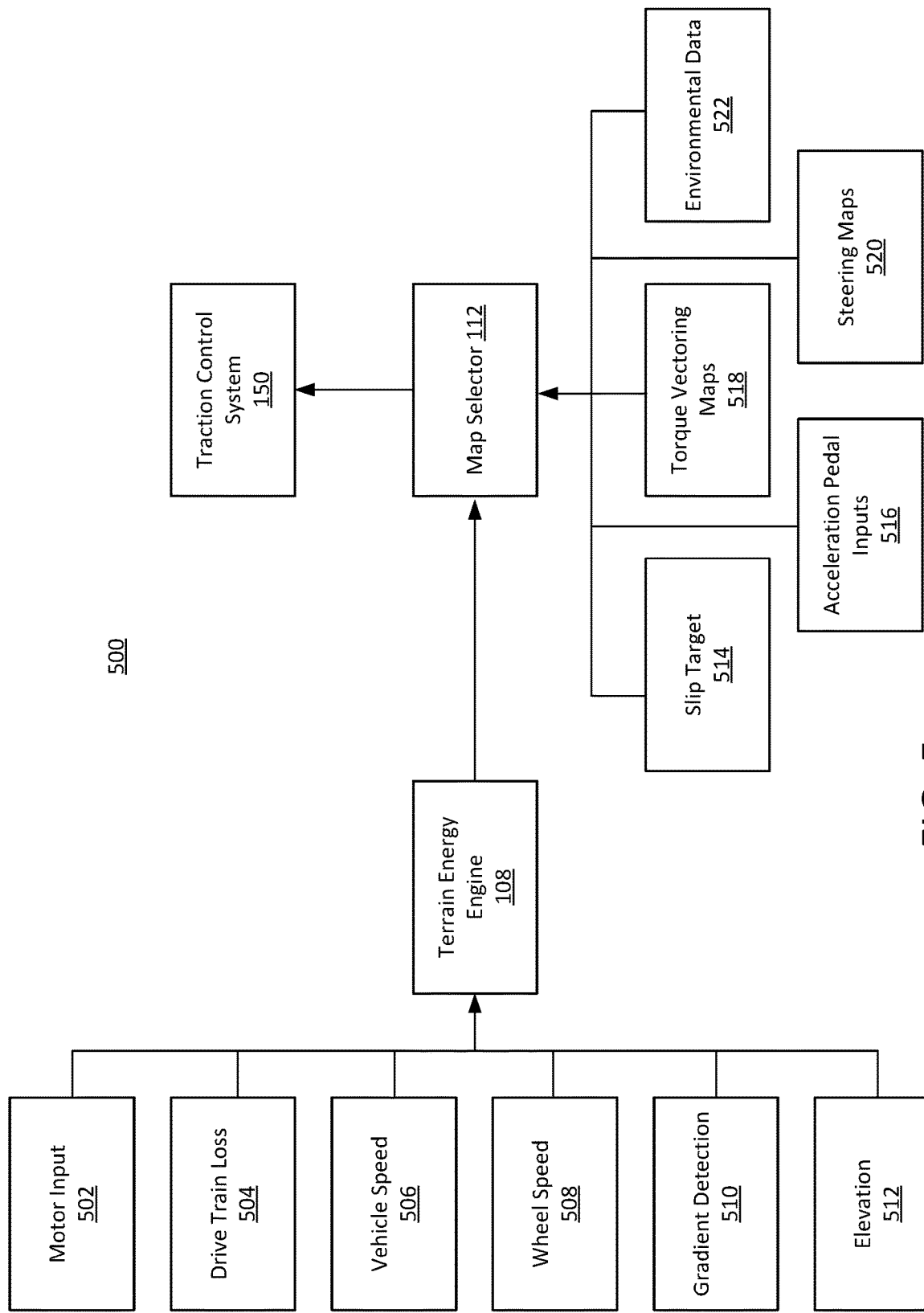
FIG. 5 depicts an example data flow diagram for a drag detection system, such as the drag detection system of FIG. 1.

FIG. 5 depicts an example data flow diagram 500 for a drag detection system, such as the system 100 of FIG. 1. A terrain energy engine 108 determines the energy imparted to terrain. For example, the terrain energy engine 108 can receive an indication of input energy 502 provided to an electric motor 104 which can lead torque generated by the electric motor 104 such that the terrain energy engine 108 can determine a rolling drag faster than some systems which detect a torque output of a wheel or electric motor 104. To determine the energy imparted to the driving surface, the terrain energy engine 108 can predict an amount of drive train loss 504, such as inverter or motor efficiency, and thermal losses due to bearings, heating of suspension components, or other drive train elements. Some drive train losses which are recaptured or substantially recaptured (e.g., spring movement or tire deformation) can be omitted or discounted to omit any recaptured portion of energy.

The terrain energy engine 108 can determine energy accumulated as kinetic energy based on vehicle speed 506 and an indication of vehicle mass for the vehicle, such as by determining translational kinetic energy ($\frac{1}{2}$ $mv^2$) and rotational kinetic energy (0.51 $\omega^2$) for the wheel speed 508 and other rotating components, where a moment of inertia, I can be retrieved from the drivetrain parameters 122, or the drivetrain parameters 122 can include a lookup for total energy based on vehicle speed 506. The terrain energy engine 108 can determine accumulated potential energy according to a distance and a detected gradient 510, a pressure, a location in combination with a GNSS system or map, an elevation 512, or other data. The terrain energy engine 108 can determine aerodynamic drag losses based on the vehicle speed and various environmental sensors 106 (e.g., humidity, pressure, or temperature). The terrain energy engine 108 can convey a determined rolling drag to a map selector 112.

The map selector 112 can select a performance map 124. A selection of a map can refer to an adjustment, calibration, or other change relative to another reference value or map. For example, the map selector 112 can select various performance maps 124 based on the rolling drag, friction, temperature, or other dimensions of a multi-dimensional data structure. The map selector 112 can select a slip target 514 for one or more wheel assemblies or electric motors 104. The map selector 112 can select an acceleration pedal input map 516 to correlate a pedal position to an amount of torque, an accelerator sensitivity, or an accelerator response rate. For example, a damped accelerator sensitivity can increase efficiency of a vehicle, increase vehicle range, and lower charging-related emissions. The map selector 112 can select a torque vectoring map 518. For example, an amount of vehicle rotation can vary between pavement, snow, or sand. Detection of a mismatch of a torque vectoring map 518 can avoid a vehicle employing a pavement focused torque vectoring map 518 from becoming sand bound by maintaining non-translational kinetic energy while traversing sand dunes. Inversely, detection of a mismatch of a torque vectoring map can avoid a vehicle employing a sand focused map from premature wearing tires, or reduced energy efficiency while traversing an interstate highway. The map selector 112 can select a steering map 520 to correlate a detection position of a steering angle sensor 106 with a movement of a steering arm or tie rod. For example, the steering map 520 can depend on vehicle speed, steering angle, vehicle dynamics received from the traction control system 150, or selected driving mode. The map selector 112 can receive various information related to the vehicle such as humidity, temperature, or other environmental data 522 to select a map. For example, a data structure indicative of a performance map 124 or operating parameter 126 can include a dimension of an environmental condition, such that the selection is based on temperature or other environmental data 522.

The map selector 112 can select the various maps for provision to the traction control system 150. For example, the map selector 112 can combine, adjust, or otherwise select one or more values from a selected map applicable to the traction control system 150.

Figure 6:
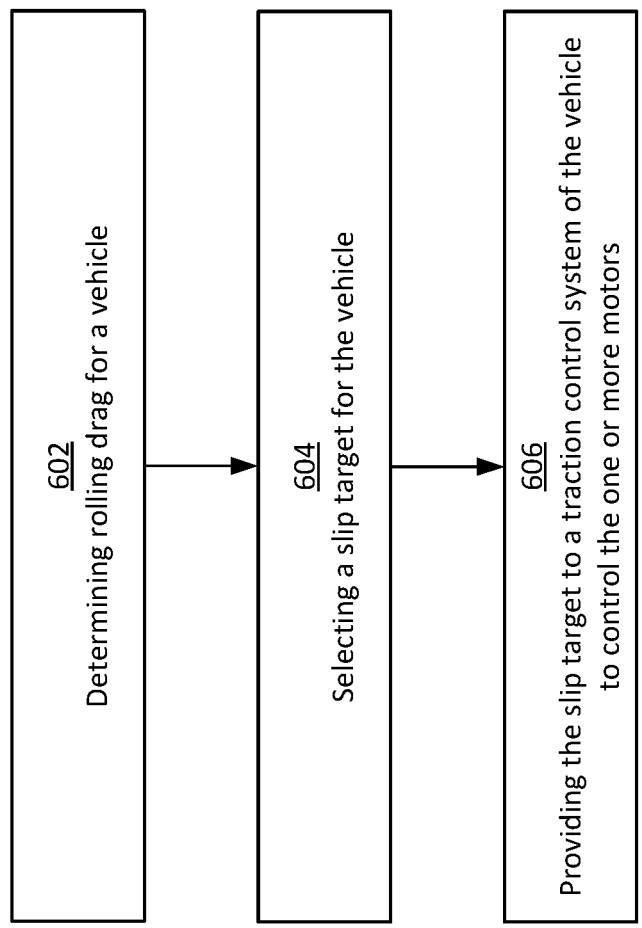
FIG. 6 depicts an example method of drag detection.

FIG. 6 depicts an example method 600 of drag detection. The method 600 can be performed by one or more systems or components depicted in FIG. 1, FIG. 2 including a computing system 102 or an electric vehicle 205. For example, the method 600 can be performed by one or more processors of an electric vehicle 205 and a memory communicatively coupled thereto. At ACT 602, a terrain energy engine 108 detects rolling drag for a vehicle. The terrain energy engine 108 can detect the rolling drag based on the energy input to one or more motors of the vehicle. The terrain energy engine 108 can determine the rolling drag by comparing the energy input to energy utilization. The terrain energy engine 108 can determine the energy utilization based on the vehicle speed, drivetrain losses, or elevation.

At ACT 604, the computing system 102 selects a slip target for the vehicle. The computing system 102 can select the slip target based on a multi-dimensional data structure including data which varies according to a rolling drag and a friction level (e.g., can include an axis organizing the data structure according to a drag level axis and a friction level axis, or include various portions of a data structure corresponding to the rolling drag or friction level). The computing system 102 can select a driving mode, partition, or other portion of the data structure based on the rolling drag, whereupon the computing system 102 can select a slip target, torque bias, or other operating parameters 126 associated therewith.

At ACT 606, the computing system 102 provides the slip target 514 to a traction control system 150 of the vehicle to control the one or more motors. The computing system 102 can provide the slip target 514 itself, or an indication of the slip target 514 such as a reference identifier of a performance map 124. The computing system 102 can convey the performance map 124 to the traction control system 150 by file transfer, or via an indication of a selection of a performance map 124, wherein the performance map 124 is accessible to the traction control system 150. The computing system 102 can convey the slip target 514 via an offset to the traction control system 150. The computing system 102 can continue to detect the rolling drag to determine slip targets, torque biases, and other operating parameters 126 as the vehicle traverses various terrain types.

Figure 7:
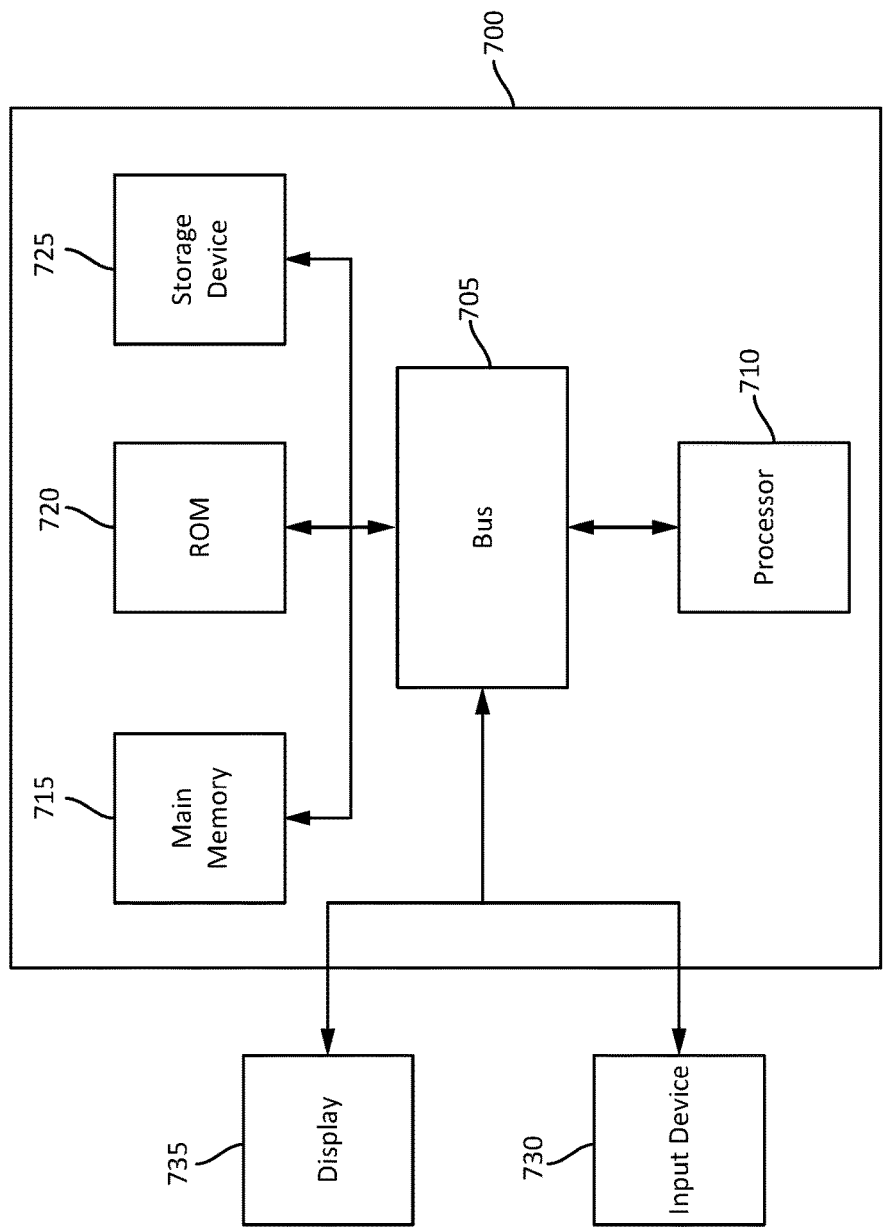
FIG. 7 is a block diagram illustrating an architecture for a computer system that can be employed to implement elements of the systems and methods described and illustrated herein.

FIG. 7 is a block diagram illustrating an architecture for a computer system that can be employed to implement elements of the systems and methods described and illustrated herein, including, for example, the systems depicted in FIG. 1 and FIG. 2, and the method depicted in FIG. 6. The computing system 700 includes at least one bus 705 or other communication component for communicating information and at least one processor 710 or processing circuit coupled to the bus 705 for processing information. The computing system 700 can also include one or more processors 710 or processing circuits coupled to the bus for processing information. The computing system 700 also includes at least one main memory 715, such as a random access memory (RAM) or other dynamic storage device, coupled to the bus 705 for storing information, and instructions to be executed by the processor 710. The main memory 715 can be used for storing information during execution of instructions by the processor 710. The computing system 700 may further include at least one read only memory (ROM) 720 or other static storage device coupled to the bus 705 for storing static information and instructions for the processor 710. A storage device 725, such as a solid-state device, magnetic disk or optical disk, can be coupled to the bus 705 to persistently store information and instructions.

The computing system 700 may be coupled via the bus 705 to a display 735, such as a liquid crystal display, or active matrix display, for displaying information to a user such as a driver of the electric vehicle 205 or other end user. An input device 730, such as a keyboard or voice interface may be coupled to the bus 705 for communicating information and commands to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. Hard-wired circuitry can be used in place of or in combination with software instructions together with the systems and methods described herein. Systems and methods described herein are not limited to any specific combination of hardware circuitry and software.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors 106 providing any value determined herein, sensors 106 providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface 110 or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
   a computing system comprising one or more processors, coupled with memory, to:
   determine, for a vehicle, rolling drag based on energy input to one or more motors of the vehicle and a speed of the vehicle;
   select, based on the rolling drag and a friction level associated with a surface on which the vehicle traverses, a slip target for the vehicle; and
   provide the slip target to a traction control system of the vehicle to control the one or more motors.

2. The system of claim 1, comprising:
   the computing system to determine the energy input to the one or more motors based on electrical parameters of the one or more motors.

3. The system of claim 1, comprising:
   the computing system to determine the energy input to the one or more motors based on an amount of current and an amount of voltage provided to the one or more motors.

4. The system of claim 1, comprising:
   the computing system to determine the rolling drag based on a comparison of the energy input to the one or more motors and the speed of the vehicle.

5. The system of claim 1, comprising:
the computing system to select the slip target based on a lookup in a multi-dimensional data structure that comprises a plurality of partitions corresponding to a plurality of types of driving surfaces.

6. The system of claim 1, comprising the computing system to:
determine a temperature associated with an environment in which the vehicle traverses;
select a multi-dimensional data structure based on the temperature; and
select the slip target based on a lookup in the multi-dimensional data structure selected based on the temperature.

7. The system of claim 1, comprising the computing system to:
receive, via a user interface of the vehicle, a selection of a drive mode of the vehicle that includes a second slip target different from the slip target;
determine, based on a lookup in a multi-dimensional data structure with the rolling drag and the friction level, that the second slip target of the drive mode does not satisfy a tolerance; and
override, based on the determination that the second slip target does not satisfy the tolerance indicated via the lookup in the multi-dimensional data structure, the second slip target with the slip target.

8. The system of claim 1, comprising the computing system to:
receive, via a user interface of the vehicle, a selection of a drive mode of the vehicle that includes a second slip target different from the slip target;
determine, based on a lookup in a multi-dimensional data structure with the rolling drag and the friction level, that a difference between the second slip target and the slip target satisfies a tolerance threshold; and
override, based on the satisfaction of the tolerance threshold, the slip target with the second slip target to provide the second slip target to the traction control system of the vehicle to control the one or more motors.

9. The system of claim 1, wherein the one or more motors comprise a front motor and a rear motor, comprising:
the computing system to select, based on the rolling drag and the friction level, a torque bias for the slip target between the front motor and the rear motor.

10. The system of claim 1, wherein the one or more motors comprise a front motor and a rear motor, comprising:
the computing system to select a torque bias for the slip target between the front motor and the rear motor based on the rolling drag, the friction level, and a temperature.

11. A method, comprising:
determining, by a computing system comprising one or more processors coupled with memory, rolling drag for a vehicle based on energy input to one or more motors of the vehicle and a speed of the vehicle;
selecting, by the computing system, based on the rolling drag and a friction level associated with a surface on which the vehicle traverses, a slip target for the vehicle; and
providing, by the computing system, the slip target to a traction control system of the vehicle to control the one or more motors.

12. The method of claim 11, comprising:
determining, by the computing system, the energy input to the one or more motors based on electrical parameters of the one or more motors.

13. The method of claim 11, comprising:
determining, by the computing system, the energy input to the one or more motors based on an amount of current and an amount of voltage provided to the one or more motors.

14. The method of claim 11, comprising:
determining, by the computing system, the rolling drag based on a comparison of the energy input to the one or more motors and the speed of the vehicle.

15. The method of claim 11, comprising:
selecting, by the computing system, the slip target based on a lookup in a multi-dimensional data structure that comprises a plurality of partitions corresponding to a plurality of types of driving surfaces.

16. The method of claim 11, comprising:
determining, by the computing system, a temperature associated with an environment in which the vehicle traverses;
selecting, by the computing system, a multi-dimensional data structure based on the temperature; and
selecting, by the computing system, the slip target based on a lookup in the multi-dimensional data structure selected based on the temperature.

17. The method of claim 11, comprising:
receiving, by the computing system via a user interface of the vehicle, a selection of a drive mode of the vehicle that includes a second slip target different from the slip target;
determining, by the computing system, based on a lookup in a multi-dimensional data structure with the rolling drag and the friction level, that the second slip target of the drive mode does not satisfy a tolerance; and
overriding, by the computing system based on the determination that the second slip target does not satisfy the tolerance indicated via the lookup in the multi-dimensional data structure, the second slip target with the slip target.

18. The method of claim 11, comprising:
receiving, by the computing system via a user interface of the vehicle, a selection of a drive mode of the vehicle that includes a second slip target different from the slip target;
determining, by the computing system based on a lookup in a multi-dimensional data structure with the rolling drag and the friction level, that a difference between the second slip target and the slip target satisfies a tolerance threshold; and
overriding, by the computing system based on the satisfaction of the tolerance threshold, the slip target with the second slip target to provide the second slip target to the traction control system of the vehicle to control the one or more motors.

19. An electric vehicle, comprising:
a plurality of electric motors; and
a computing system comprising one or more processors, coupled with memory, to:
determine, for the electric vehicle, rolling drag based on energy input to the plurality of electric motors of the electric vehicle and a speed of the electric vehicle;
select, based on the rolling drag and a friction level associated with a surface on which the electric vehicle traverses, a slip target for the electric vehicle; and
provide the slip target to a traction control system of the electric vehicle to control the plurality of electric motors.

20. The electric vehicle of claim 19, comprising:
the computing system to determine the energy input to the plurality of electric motors based on electrical parameters of the plurality of electric motors.

* * * * *